United States Patent
Schmalzried et al.

(10) Patent No.: US 10,597,157 B1
(45) Date of Patent: Mar. 24, 2020

(54) UNMANNED AERIAL VEHICLE FLEET MANAGEMENT

(71) Applicant: Wing Aviation LLC, Mountain View, CA (US)

(72) Inventors: James Schmalzried, San Jose, CA (US); André Prager, Sunnyvale, CA (US); Martin Kubie, San Francisco, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 16/285,968

(22) Filed: Feb. 26, 2019

Related U.S. Application Data

(63) Continuation-in-part of application No. 16/132,712, filed on Sep. 17, 2018.

(51) Int. Cl.
  *B64C 39/02* (2006.01)
  *G05D 1/00* (2006.01)
  *B65G 1/137* (2006.01)

(52) U.S. Cl.
  CPC .......... *B64C 39/024* (2013.01); *B65G 1/1373* (2013.01); *G05D 1/0027* (2013.01);
  (Continued)

(58) Field of Classification Search
  CPC ........ B64C 2201/042; B64C 2201/146; B64C 39/024; G08G 5/0013; G08G 5/0069;
  (Continued)

(56) References Cited

U.S. PATENT DOCUMENTS 9,346,560 B2  5/2016  Wang
9,505,493 B2  11/2016 Borko
(Continued)

FOREIGN PATENT DOCUMENTS

CN    104236548 A    9/2014
CN    10416635 A  * 11/2014  ........... G05B 19/042
(Continued)

OTHER PUBLICATIONS

International Search Report, dated Jan. 2, 2020 in corresponding International Patent Application No. PCT? US2019/051306, 3 pages.
(Continued)

*Primary Examiner* — Anthony R Jimenez
(74) *Attorney, Agent, or Firm* — Christensen O'Connor Johnson Kindness PLLC

(57) ABSTRACT

An unmanned aerial vehicle (UAV) includes one or more sources of propulsion, a power source, and communication system. The UAV also includes a controller coupled to the communication system, the power source, and the one or more sources of propulsion. The controller includes logic that when executed by the controller causes the UAV to perform operations, including measuring a power source charge level of the UAV; sending a signal including the power source charge level of the UAV to an external device; receiving movement instructions from the external device; and engaging the one or more sources of propulsion to move the UAV from a first location on a storage rack to a second location within a storage facility.

19 Claims, 8 Drawing Sheets

(52) U.S. Cl.
  CPC .. *B64C 2201/042* (2013.01); *B64C 2201/066* (2013.01); *B64C 2201/128* (2013.01); *B64C 2201/146* (2013.01)

(58) Field of Classification Search
  CPC .... G07C 5/008; G05D 1/0027; G05D 1/0022; G05D 1/104
  USPC .............................................................. 701/3
  See application file for complete search history.

(56) References Cited

U.S. PATENT DOCUMENTS

| | | | |
|---|---|---|---|
| 9,671,791 B1 | 6/2017 | Paczan | |
| 2015/0370251 A1* | 12/2015 | Siegel | G05D 1/0027 701/2 |
| 2016/0364989 A1 | 12/2016 | Speasl et al. | |
| 2017/0092109 A1 | 3/2017 | Trundle et al. | |
| 2017/0225799 A1 | 8/2017 | Selwyn et al. | |
| 2017/0344000 A1 | 11/2017 | Krishnamoorthy et al. | |
| 2018/0094935 A1 | 4/2018 | O'Brien et al. | |

FOREIGN PATENT DOCUMENTS

| | | | | |
|---|---|---|---|---|
| CN | 207311860 U | 8/2017 | | |
| JP | 2017077879 A1 | 4/2017 | | |
| KR | 101712280 B1 | 8/2015 | | |
| WO | WO-2016137982 A1 * | 9/2016 | ........... | B64C 39/024 |
| WO | 2018078588 A1 | 5/2018 | | |

OTHER PUBLICATIONS

International Search Report and Written Opinion, dated Jan. 2, 2020 in corresponding International Patent Application No. PCT/US2019/051306, 11 pages.

\* cited by examiner

UNMANNED AERIAL VEHICLE FLEET MANAGEMENT

CROSS-REFERENCE TO RELATED APPLICATIONS

This application is a continuation-in-part of U.S. application Ser. No. 16/132,712, filed Sep. 17, 2018, the contents of which are incorporated by reference herein in their entirety.

TECHNICAL FIELD

This disclosure relates generally to unmanned aerial vehicles (UAVs).

BACKGROUND INFORMATION

An unmanned vehicle, which may also be referred to as an autonomous vehicle, is a vehicle capable of travel without a physically-present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Controlling unmanned vehicles can be problematic especially when there are a large number of vehicles in close proximity. Crashes may irreparably damage the vehicles, and pose a hazard for people in the vicinity of the moving vehicles.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
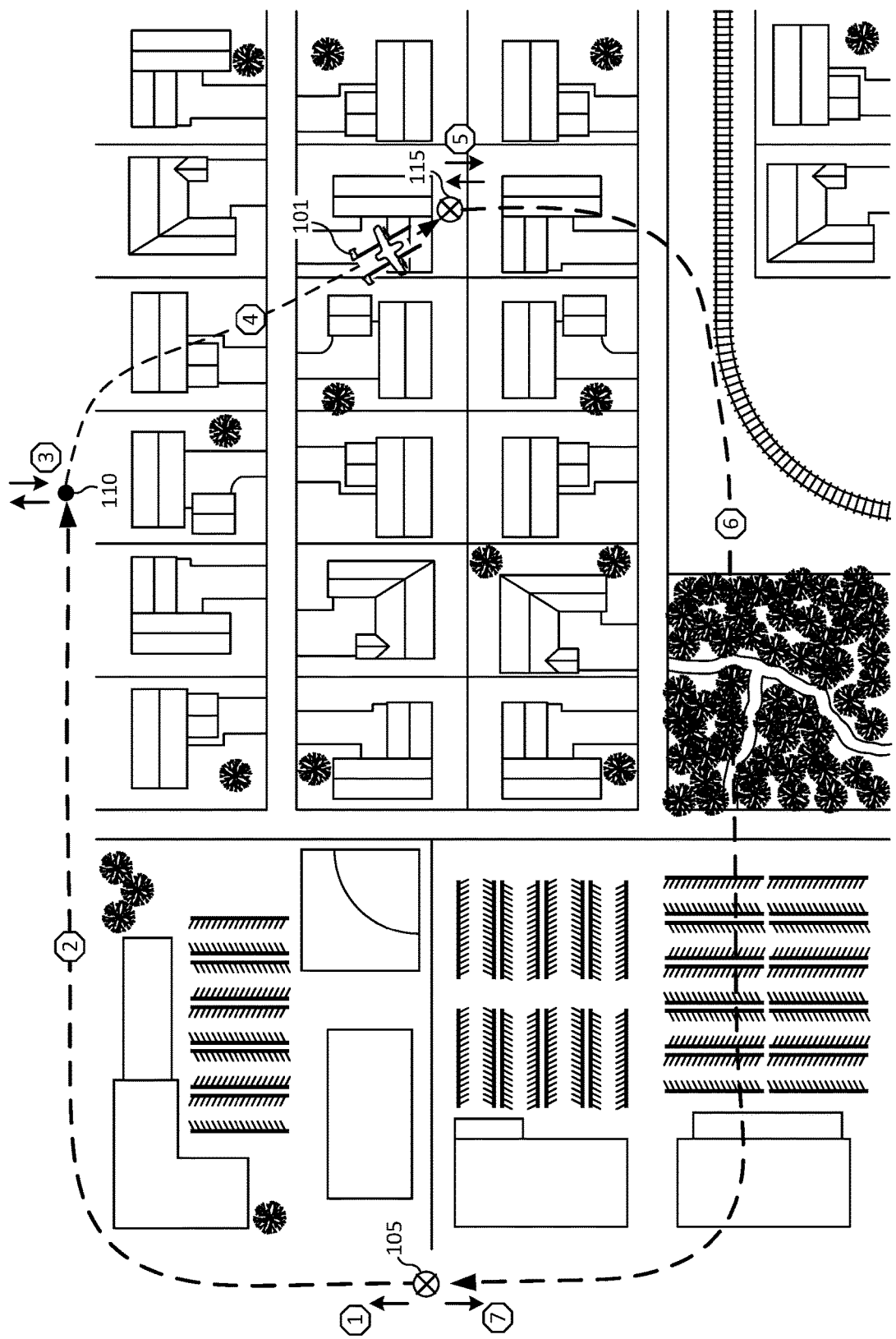
FIG. 1 illustrates an unmanned aerial vehicle (UAV) having multiple mission segments, in accordance with an embodiment of the disclosure.

Embodiments of a system, apparatus, and method for unmanned aerial vehicle (UAV) fleet management are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

When UAV operations reach significant scale, UAV operators (operators) need to maintain large fleets of UAVs. This is particularly true in the case where UAVs are used for package delivery. A likely scenario for UAV storage is for a UAV fleet to be stored in some large facility (e.g., a warehouse) during times of non-operation or during recharging. For these large scale storage systems, operators will need methods to manage these fleets, including how to get a UAV in and out of that storage facility, and in the case of package delivery that originates at the same facility, how to load packages onto aircraft in an efficient manner that minimizes the time delay between a package being ready for delivery and the customer receiving the package. Presented here are ways to move, organize, and dynamically rearrange UAVs inside of a storage facility.

There are several key high level points to this methodology: (1) aircraft may arrange or rearrange themselves (under their own power) inside of a facility dynamically based on the needs of the fleet; (2) aircraft used for delivery purposes may be staged fully charged waiting for a package to minimize delivery time of a package to a customer; (3) these processes are not limited to 2-dimensional spaces, but can be extended to 3-dimensional spaces as well.

Here, UAVs returning from a mission would enter a facility through a known ingress point (e.g., a door, hatch, opening, window, etc.) and head for a landing pad. Also important to note is that landing pads may also contain aircraft recharging systems that automatically re-charge the UAV batteries upon landing. In some embodiments the batteries/power sources may be irremovably coupled to the UAV, and the UAV may receive charge via direct electrical connection (e.g., exposed electrodes) to a charging pad disposed on a storage rack. Alternately, the landing pads may contain battery exchange systems to remove a depleted battery from a UAV and install a fully charged battery (this may also be referred to as "a charging pad").

In one embodiment, UAVs arriving to the facility would enter the facility through an ingress point and fly to an unoccupied landing pad that is closest to the egress point. The UAV may land on any un-occupied landing pad or it may be commanded to land on a specific predefined landing pad by an external computing system (e.g., a UAV control system). The UAV would wait until it is fully re-charged, then fly to an egress staging location where the UAV would wait until a package is loaded into/onto the UAV. Once the package is loaded into the UAV, it would depart the facility through the egress point.

In some embodiments, power consumption upon return from a flight may be restricted or battery state of charge may be extremely low in some cases. In those cases, it is possible that the UAVs will land on a landing pad nearest the ingress point. If a multitude of aircraft with low batteries accumulate near the ingress point, it may be necessary to clear the landing pads near the ingress point and keep them open for inbound aircraft. In this case, the first UAVs that landed near the ingress point must be moved away from the ingress point. It may be prohibitive for this movement to be handled by human operators, and may be expensive for this move to be handled by additional robotic systems in the facility.

Therefore, the UAVs may be commanded to take flight inside the facility and fly to a new unoccupied landing pad that is further away from the ingress point, and is closer to the egress point. The command to re-position may be initiated from the UAV itself (based on on-board sensors and controllers such as battery management systems) or it may come from a centralized system. The command may be based on event triggers such as time_since_landed or battery_state_of_charge (other triggers are possible as well).

As the UAVs continue to re-charge on landing pads, they may continue to re-organize towards the egress point, based on event triggers. This reorganization may be coordinated (by a central computing system) or it may be ad-hoc and initiated by the UAVs. In the latter case, the UAV may request to move to a new landing pad, and a central computing system would inform the UAV which landing pad to move to, and authorize it a time duration upon which to complete the move. By a central system authorizing the move, the central system can ensure that aircraft in motion will not collide with other aircraft.

UAVs may navigate inside the facility using computer vision systems that follow visual reference markers or cues located throughout the facility for the UAV to refer to. These markers may be in the form of fiducial markings, light beacons, or others. There may be a marker that is located at each landing pad, and act as an address for that landing pad (e.g., using a Quick Response code or the like). The UAV may use these addresses as navigational aids as it moves from one landing pad to another. The UAV may optionally use navigational aids located not at landing pads as a means of locating itself in the space and moving from one position to another. Or, by simply recognizing specific visual cues from inside the facility, the UAV has awareness of its location.

With this system and methodology in place, it is also possible that the landing pads do not need to only be in a 2D planar array, but may also be in a 3D structure. Aircraft may be commanded to change vertical levels as well as lateral (XY) positions. In some embodiments, different horizontal and vertical pads are reserved for different class aircraft (e.g., larger or smaller wingspan, different charge rates, different payload capacities, etc.). Aircraft may be commanded to specific locations based on their class of aircraft.

The package staging areas near the egress point may include simple infrastructure that facilitates efficient package loading of delivery aircraft. Physically locating the package staging areas near the egress point will reduce the time from a package being ready for delivery and the package being delivered.

The processes described herein may keep the aircraft staging areas occupied with fully charged aircraft, and as soon as a spot at a staging area was vacated by a departing aircraft, the centralized system would command another aircraft to that position. The staging areas may also have re-charging systems that maintain aircraft at, or close to, 100% state of charge so the aircraft always have maximum battery capacity for a delivery mission. The system may let UAVs fly with less than 100% charge if the mission is short enough for the UAV to not run out of battery.

The following disclosure will discuss the embodiments described above, and other embodiments, as they relate to the figures.

FIG. 1 illustrates an example UAV 101 having multiple mission segments, in accordance with an embodiment of the disclosure. First, the control system may pass mission instructions (which may be generated by a user or the like) to UAV 101. In the illustrated embodiment, UAV 101 has a mission wherein it launches from an egress point in a nest location 105 (e.g., a storage structure) and rises to its cruising altitude (mission segment 1: hover profile), cruises to a waypoint 110 (mission segment 2: cruise profile), descends vertically to acquire a package and then ascends vertically back to its cruising altitude (mission segment 3: hover profile), cruises to a delivery destination 115 (mission segment 4: cruise profile), descends vertically to deliver the package and then ascends vertically back to its cruising altitude (mission segment 5: hover profile), cruises back to nest location 105 (mission segment 6: cruise profile), and descends into an ingress point of a nest 105 (mission segment 7: hover). In nest 105, UAV may be directed to a charging pad.

Figure 2:
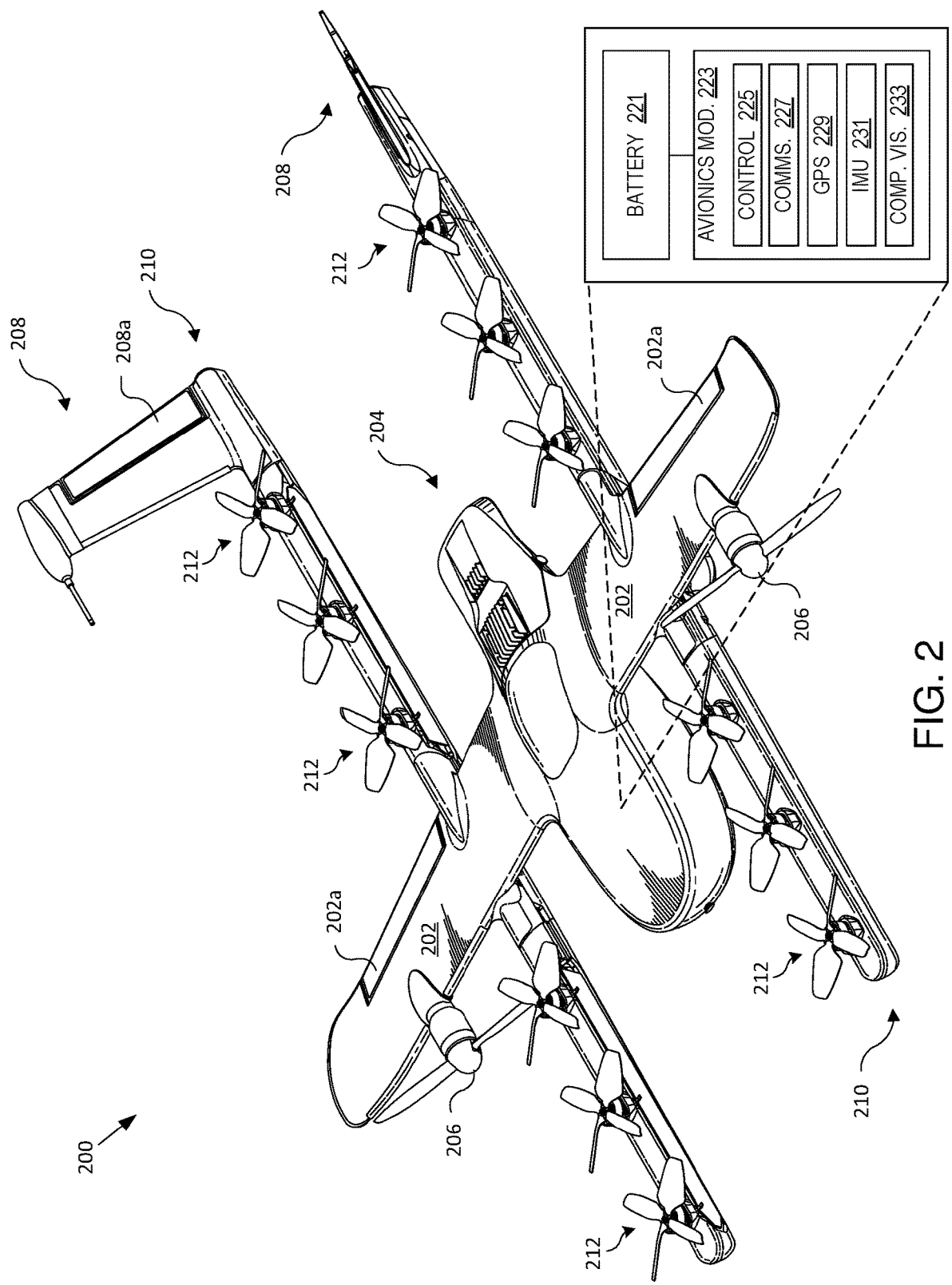
FIG. 2 is a perspective view illustration of a demonstrative unmanned aerial vehicle (UAV), in accordance with an embodiment of the disclosure.

FIG. 2 is a perspective view illustration of a demonstrative UAV 200, according to an embodiment of the disclosure. UAV 200 is one possible implementation of UAV 101 illustrated in FIG. 1. UAV 200 is a fixed-wing UAV, which as the name implies, has a wing assembly 202 that can generate lift based on the wing shape and the vehicle's forward airspeed when propelled horizontally by cruise rotors 206. For instance, wing assembly 202 may have an airfoil-shaped cross section to produce an aerodynamic lift force on the UAV 200. The illustrated embodiment of UAV 200 also includes hover rotors 212 to provide vertical propulsion.

The illustrated embodiment of UAV 200 includes a fuselage 204. In one embodiment, fuselage 204 is modular and includes battery module 221 (one example of a power source), avionics module 223, a mission payload module, and a fuselage cover. These modules may be detachable from each other and mechanically securable to each other to contiguously form at least a portion of the fuselage or UAV main body.

The battery module 221 may include a cavity for housing one or more batteries 221 for powering UAV 200. The avionics module 223 houses flight control circuitry of UAV 200, which may include a controller 225 and memory, communication systems 227 and antennas (e.g., cellular transceiver, WiFi transceiver, etc.), and various sensors (e.g., global positioning sensor 229, inertial measurement unit (IMU) 223, computer vision module 223 (e.g., LIDAR, image sensors, time-of-flight systems, etc.), a magnetic compass, etc.). The mission payload module houses equipment associated with a mission of UAV 200. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.). In yet another embodiment, the mission payload module may include an additional battery holder to house additional or larger batteries for extended flight times. Of course, the mission payload module may provide mixed use payload capacity (e.g., additional battery and camera equipment) for a variety of mix-use missions.

As illustrated, UAV 200 includes cruise rotors 206 positioned on wing assembly 202, which can each include a motor, shaft, and propeller, for propelling UAV 200 horizontally. The illustrated embodiment of UAV 200 further includes two boom assemblies 210 that secure to wing assembly 202. Hover rotors 212 are mounted to boom assemblies 210. Hover rotors 212 can each include a motor, shaft, and propeller, for providing vertical propulsion. Vertical propulsion units 212 may be used during a hover mode where UAV 200 is descending (e.g., to a delivery location), ascending (e.g., following a delivery), or maintaining a constant altitude. Stabilizers 208 (or tails) may be included with UAV 200 to control pitch and stabilize the UAV's yaw (left or right turns) during cruise. In some embodiments, during cruise mode hover rotors 212 are disabled and during hover mode cruise rotors 206 are disabled. In other embodiments, hover rotors 212 are merely powered low during cruise mode and/or cruise rotors 206 are merely powered low during hover mode.

During flight, UAV 200 may control the direction and/or speed of its movement by controlling its pitch, roll, yaw, and/or altitude. Thrust from cruise rotors 206 is used to control air speed. For example, the stabilizers 208 may include one or more rudders 208a for controlling the UAV's yaw, and wing assembly 202 may include elevators for controlling the UAV's pitch and/or ailerons 202a for controlling the UAV's roll. As another example, increasing or decreasing the speed of all the propellers simultaneously can result in UAV 200 increasing or decreasing its altitude, respectively.

As stated, UAV has one or more sources of propulsion (e.g., vertical propulsion units 212 and cruise rotors 206), and a power source (e.g., battery or hybrid energy system) coupled to power (e.g., with motors or the like) the one or more sources of propulsion. Communication system 227 (e.g., RF transceiver, Bluetooth transceiver, WiFi transceiver, or the like) is coupled to communicate with an external device (e.g., the communication system of an aircraft control system or fleet management system—for example communication system 339 in FIGS. 3A-3C). Controller 225 is coupled to communication system 227, power source (e.g., battery 221), and the one or more sources of propulsion (e.g., vertical propulsion units 212 and cruise rotors 206), and controller 225 includes logic that when executed by controller 225 causes UAV 200 to perform a variety of operations. The operations may include: measuring a status of UAV 200 (e.g., by employing voltage sensors to measure a battery condition, stress/strain sensors to measure a mechanical failure, retrieving UAV specifications—wingspan, length, model number, etc.—from the internal memory of the UAV, etc.). The status of UAV 200 may be sent to the external device (e.g., UAV control system), and, in response to sending the status, the external device may send movement instructions back to UAV 200. UAV 200 may receive movement instructions from the external device, and in response to receiving the movement instructions, engage the one or more sources of propulsion to move UAV 200 from a first location (e.g., a first charging pad, maintenance pad, or staging area) to a second location (e.g., a second charging pad, maintenance pad, storage location, or staging area) within a storage facility. In some embodiments, the status includes a power source charge level (e.g., 5% battery charge, 50% battery charge, 90% battery charge, etc.), and the movement instructions maybe received when the power source charge level is less than a threshold level (e.g., less than 20% charge). In this embodiment, the first location may be closer to an egress point than the second location. Put another way, the UAV control system may determine that UAV 200 has too little charge to complete a mission, and accordingly, the control system may move UAV 200 away from an egress point to charge, so it is not in the way of other incoming or outgoing UAVs. Conversely, UAV 200 may report a status when the power source charge level is greater than one or more thresholds, and UAV 200 may be moved closer to the egress point. Other UAVs (which may have a lower power level) on pads closer to the egress point may be directed to move out of the way of UAV 200 once it reaches the threshold charge level. Mid-flight UAVs may also be requested to move out of the fight path of UAV 200, while UAV 200 is flying.

In one embodiment, the status sent from UAV 200 includes a maintenance request, and the second location may include a maintenance pad (e.g., a place where UAV 200 may be taken out of service, or repaired). However, in some embodiments, the status update sent from UAV 200 may include an indicator of geographic proximity (e.g., a specific signal is sent when the UAV is within 30 feet) to the storage location (e.g., a warehouse holding all of the UAVs) after completing a mission, and the movement instructions include directions to a charging pad that is unoccupied. Put another way, when a returning UAV 200 reaches a threshold distance from the storage facility, it may send a signal to the UAV control system/facility. The control facility may send instructions to direct the incoming UAV 200 to an optimal charging pad, and the charging pad may be chosen based, at least in part, on a power source charge level of UAV 200.

In some embodiments, UAV 200 may include computer vision system 223 coupled to controller 225. UAV 200 may use the computer vision system 223 to recognize fiducial markers positioned within the storage facility, and in response to recognizing the fiducial markers, direct UAV 200 to a landing pad or the like.

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), are also possible. Although FIG. 2 illustrates one wing assembly 202, two boom assemblies 210, two forward propulsion units 206, and six vertical propulsion units 212 per boom assembly 210, it should be appreciated that other variants of UAV 200 may be implemented with more or less of these components. Furthermore, the guidance systems and methods described herein may be used with other types of UAVs, manned or unmanned vehicles in general, or otherwise.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 3A:
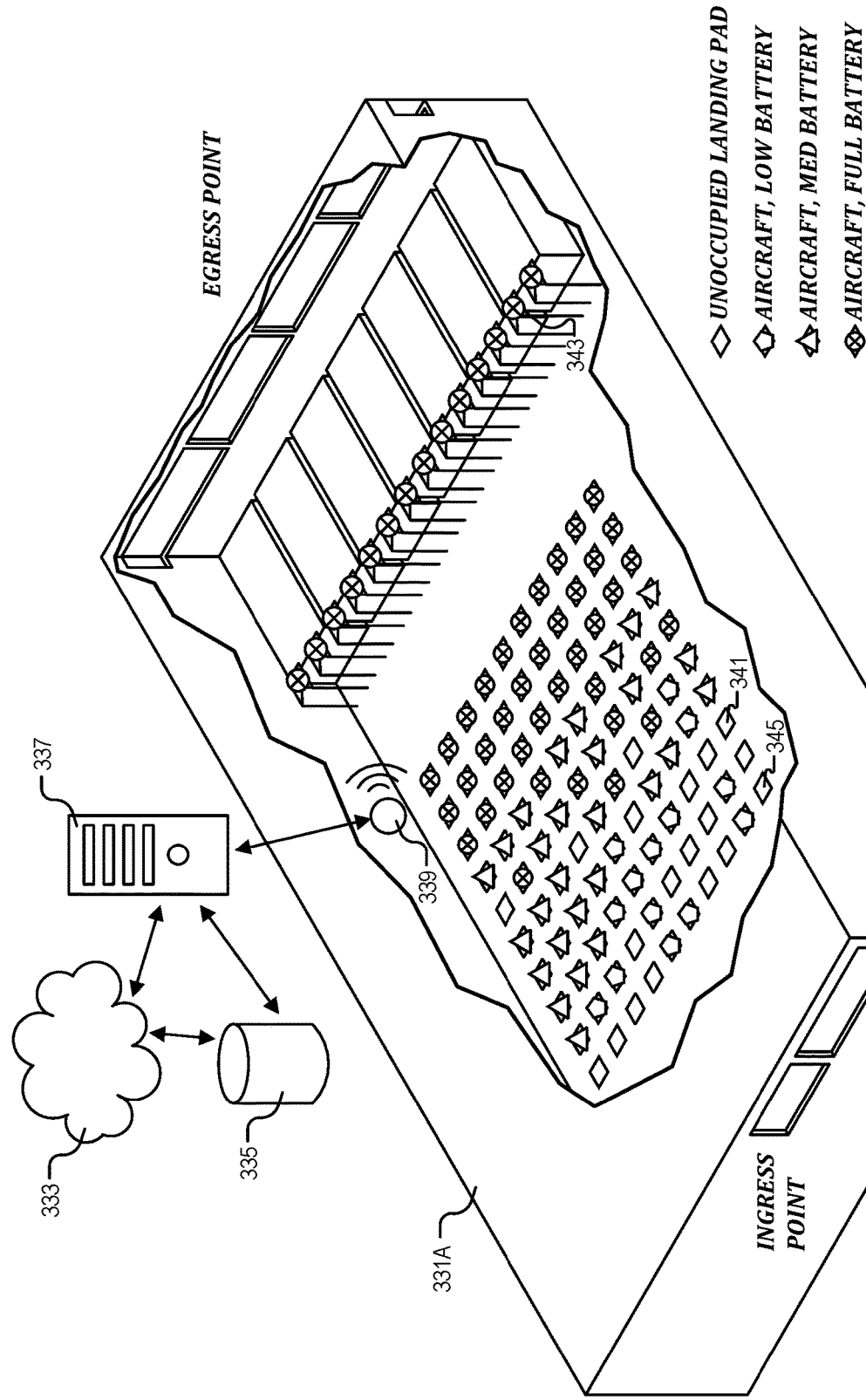
FIGS. 3A-3C illustrate storage facilities for UAVs, in accordance with several embodiments of the disclosure.
Figure 3B:
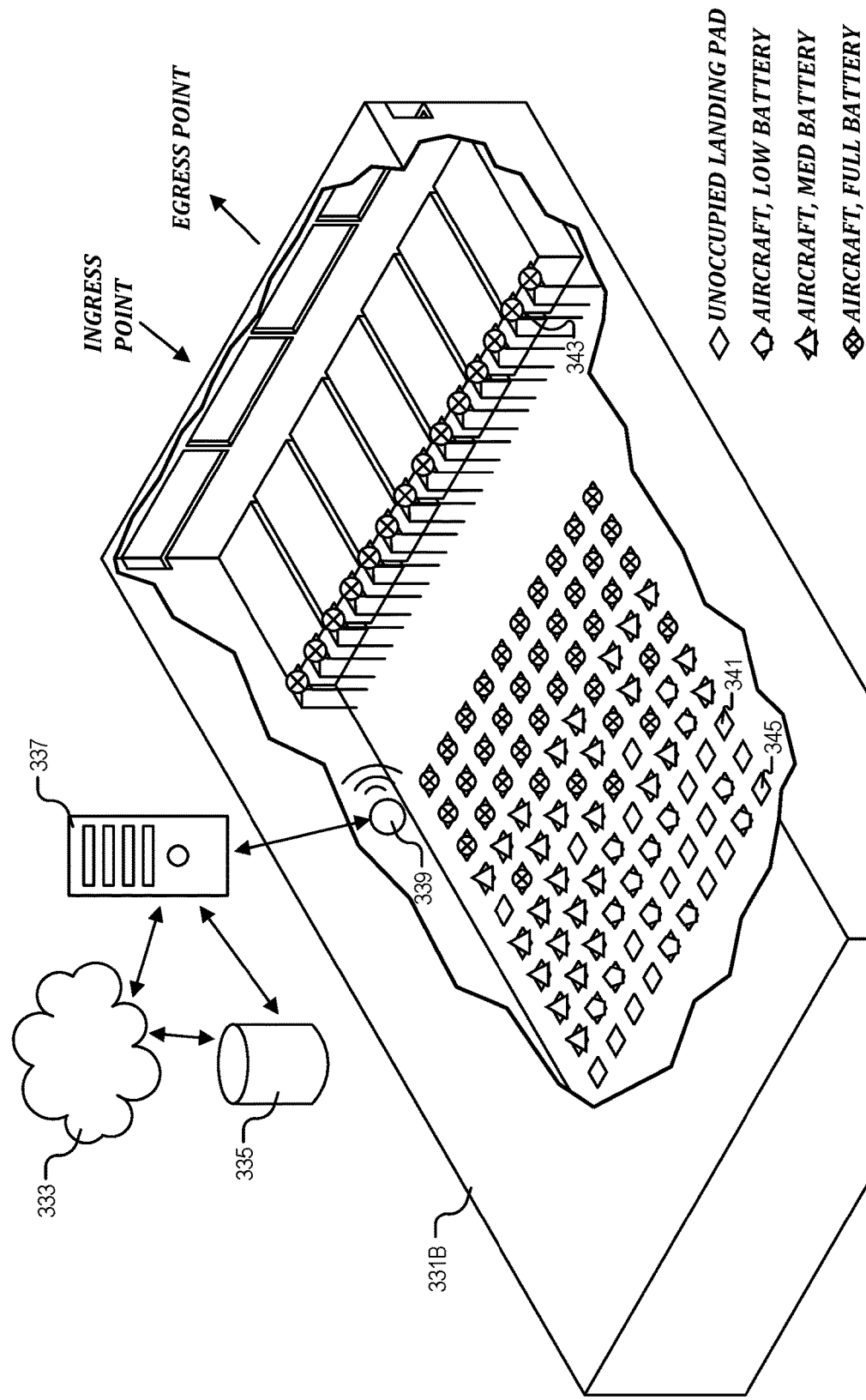
Figure 3C:
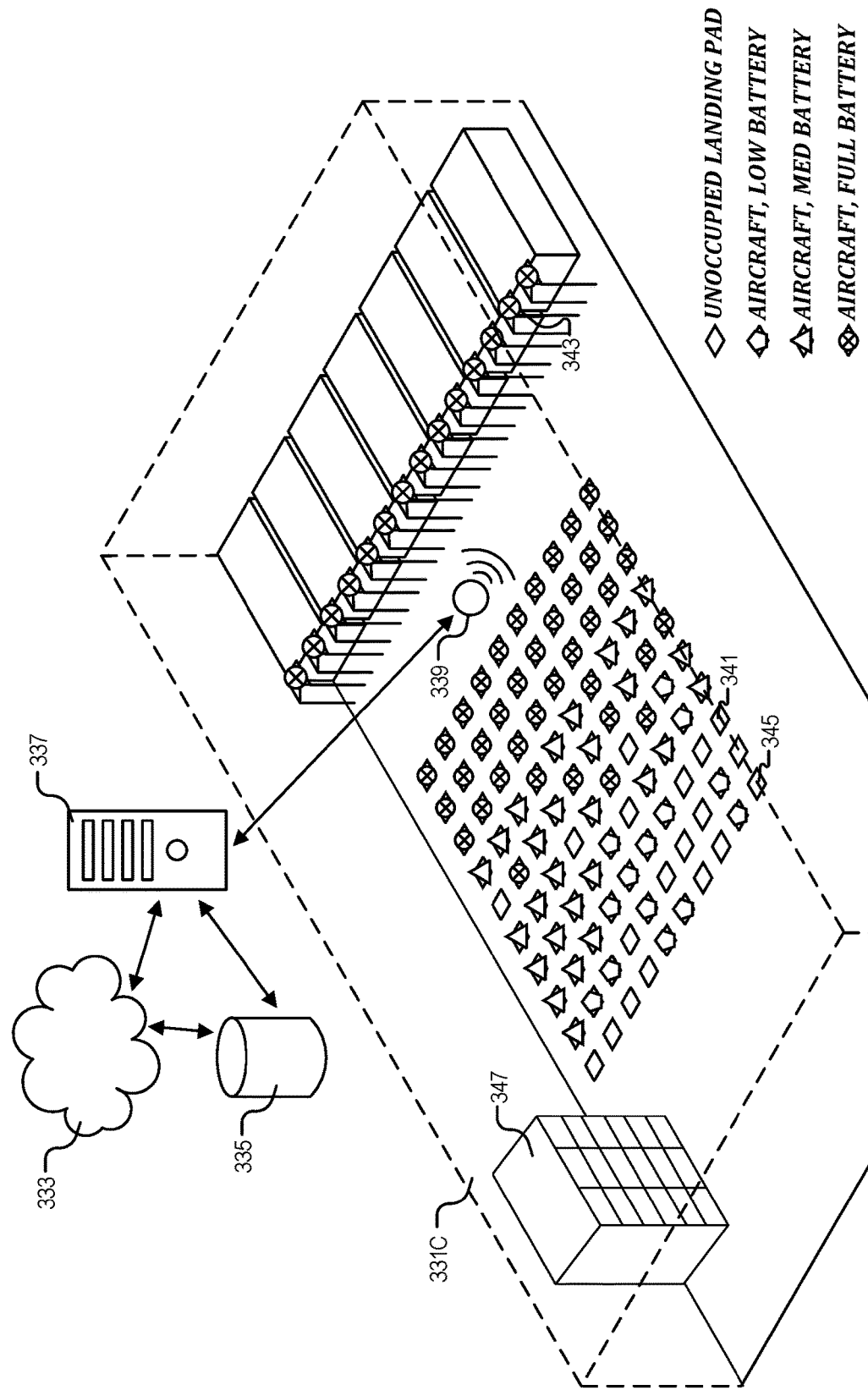

FIGS. 3A-3C illustrate storage facilities (e.g., a "nest" location 105 from FIG. 1) for UAVs, in accordance with several embodiments of the disclosure. One of skill in the art will appreciate that the components/features depicted in FIGS. 3A-3C are not mutually exclusive and can used interchangeably across storage facilities in accordance with the teachings of the present disclosure.

FIG. 3A illustrates a first enclosed storage facility 331 with separate ingress and egress points (e.g., windows that may open and close) on opposite sides of the structure. Also depicted are parts of a control system (e.g., a "control tower") for the UAVs including network 333, storage 335, controller 337 (e.g., servers in a distributed system, local computer, a combination thereof, or the like), and communication system 339 (e.g., RF transceiver, WiFi transceiver, Bluetooth, or the like). Charging pads 341, maintenance pads 345, and staging area 343 are also depicted.

In the illustrated embodiment, the control system for the UAVs receives, with a receiver (included in communication system 339), a status update from one of the UAVs. The control system may calculate with controller 337 moving instructions based on the status update. The system may then send, using communication system 339, the movement instructions to the one or more UAVs, and the movement instructions include directions to move the UAVs from a first location (e.g., a first charging pad 341, maintenance pad 345, staging area 343, or the like) to a second location (e.g., a second charging pad 341, maintenance pad 345, staging area 343, or the like) within storage facility 331A. Movement instructions may be provided to rearrange the UAVs for the reasons described above. In some embodiments, the status update may include a power source charge level (e.g., battery level) of the UAV, and the movement instructions are calculated, at least in part, based on the power source charge level (e.g., determining that a power source charge level is less than a first threshold level). In the depicted embodiment, the movement instructions include sending directions to move the UAV to the second location away from an egress point, thus freeing up space near the egress points for fully charged aircraft. This may minimize time for fully charged UAVs to fly to staging areas 343 and complete missions. Conversely, in some embodiments, the system here may promote moving fully charged UAVs towards the egress point—as shown, all of the fully charged UAVs are clustered proximate to the egress point. For example, calculating the movement instructions may include determining that the power source charge level is above a threshold level, and sending the movement instructions includes sending directions to move the UAV to the second location (e.g., staging area 343) proximate to an egress point. UAVs may be moved one by one towards the egress point as they become more fully charged.

In some embodiments, one or more UAVs may need to be moved to accommodate new aircraft entering the structure. For example, movement instructions may be sent to a second UAV that is positioned in a second location, to move to a third location, prior to sending the movement instructions to a first UAV that is positioned in a first location, to move to the second location. In this example, the second UAV may be more fully charged than the first UAV, or have a new battery pack attached, and the third location is closer to the egress point (since the second UAV is more mission-ready).

In some embodiments, the status update set from the UAV may include a maintenance request (e.g., because sensors in the UAV detect a faulty rotor, a battery that is not able to maintain a charge, a communication system that is not working properly, etc.), and the second location includes maintenance pad 345.

FIG. 3B illustrates a different embodiment of storage facility 331B including a design where the ingress and egress points are the same—the aircraft come and go through the same windows. In the depicted example, since there are shared ingress and egress points, the communication system that controls the UAV fleet may also have to control air traffic through the shared openings. For example, the system may make sure that a single UAV flies through a single opening to avoid crashes. The system may also have UAVs, with sufficient battery, pause outside the structure to wait their turn to enter the building. Similarly, if a UAV has very little charge left or is damaged after completing a mission, the control system may pause all air traffic in and out of the building, as well as clear a landing pad next to the openings in order for the damaged UAV to make a quick landing. In some embodiments, the UAV control system (or the UAVs themselves) may calculate their trajectory/vector to a new pad or location and prevent other UAVs from entering this flight path. This may be accomplished by the UAV sending the flight path to the other UAVs, or the control system preventing UAVs from entering the path. It is appreciated that the control system may send instruction to one or more UAVs simultaneously. In some embodiments, UAVs and/or the control system are programmed to keep UAVs a predetermined distance apart to avoid crashes.

FIG. 3C illustrates a different embodiment of storage facility 331C where there are no walls physically enclosing the structure—the ingress and egress points surround the storage facility on all sides. Put another way, the storage facility 331C is a geographic area containing at least one charging pad 341, maintenance pad 345, or staging area 343. Depicted here, the charging pads 341 are disposed on the floor of a designated area, and the staging areas 343 are positioned proximate to one side of the area. Similarly, communication system 339 is disposed on the floor with the pads. Also depicted is a multilayer rack 347 (e.g., a storage location) for housing UAVs, which may include charging, storage, and/or maintenance pads. Multilayer rack 347 may be used for long term storage (e.g., for UAVs that will be out of service for a day, a week, a month, or any other amount of time). This configuration depicted in FIG. 3C may be used in emergency response situations (e.g., to deliver food/water) where buildings to house the UAVs are in short supply.

Figure 4:
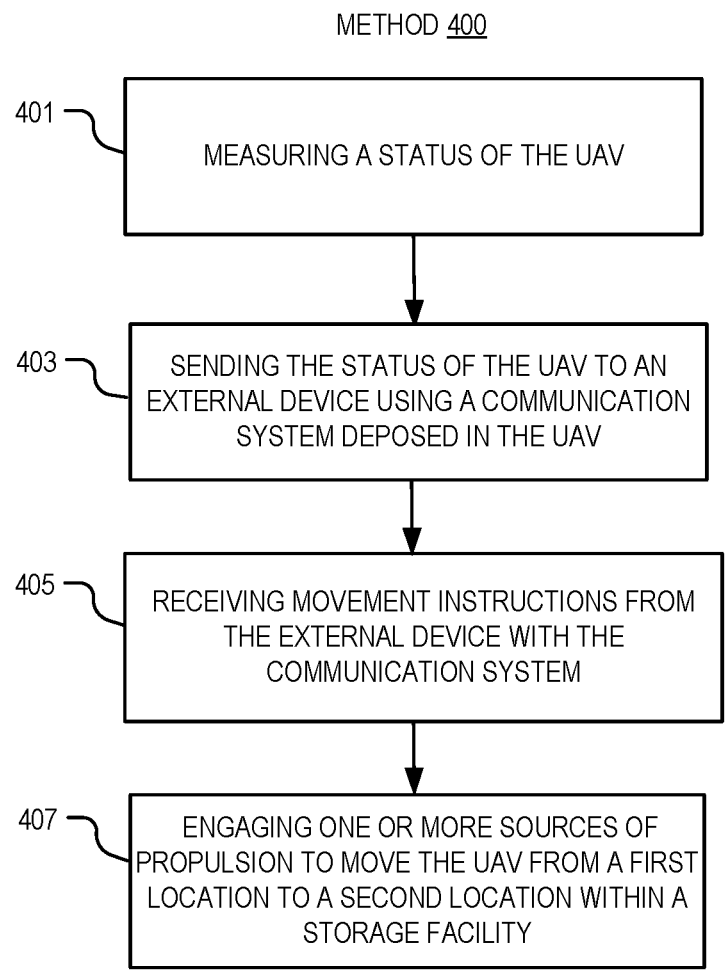
FIG. 4 is a method of controlling a plurality of UAVs, in accordance with an embodiment of the disclosure.

FIG. 4 is a method 400 of unmanned aerial vehicle (UAV) operation, in accordance with an embodiment of the disclosure. One of ordinary skill in the art will appreciate that blocks 401-407 may occur in any order and even in parallel. Additionally, blocks may be added to, or removed from, method 400, in accordance with the teachings of the present disclosure.

Block 401 shows measuring a status of the UAV using a controller in the UAV. In some embodiments, measuring the status includes measuring a power source charge level of the UAV using voltage sensors or the like. In another or the same embodiment, measuring a status may include measuring damage to the UAV, or degradation of the electronic components within. Similarly, measuring a status may include the UAV recalling its model number, type, dimensions or the like. In one embodiment, the status may include a package/payload load status. In another embodiment, the status may include a geographic proximity to the storage location (e.g., within 30 feet of an entrance to the storage facility) after completing a mission.

Block 403 illustrates sending the status of the UAV to an external device using a communication system deposed in the UAV. As depicted in FIGS. 3A-3C, the status may be received by a communication system that is part of the UAV control system (e.g., a control tower for the UAVs) in the storage facility. One of skill in the art will appreciate that there may be different communication types used during the different stages of the UAV's flight. For example, during a mission, RF communication or GPS may be used to direct the UAV through open space. However, within a storage facility, fiducial markers and WiFi/Bluetooth may be used to direct the UAV in the smaller enclosed area, and may be used to achieve better location accuracy. In some embodiments, the control system may switch navigation modes for the UAV as it is entering/leaving the storage facility.

Block 405 depicts in response to sending the status, receiving movement instructions from the external device with the communication system in the UAV. The instructions may be received with an antenna in the UAV. It is appreciated that the UAV control system may generate the movement instructions immediately after receiving the status, or a delay may be present until the system deems it necessary to send the movement data to the UAV. In some embodiments, movement instructions are not sent until information from more than one UAV is received (e.g., the system may not elect to move a UAV until another UAV need its spot on a charging, maintenance, or staging pad).

Block 407 shows, in response to receiving the movement instructions, engaging one or more sources of propulsion to move the UAV from a first location to a second location within a storage facility. In some embodiments, the control system sends the movement instructions when the power source charge level in the UAV is less than a threshold level—telling the UAV to move to a different location because its charge is too low. In some embodiments, this may include moving the UAV away from an egress point so it does not interfere with other outgoing aircraft. Conversely, the UAV may be moved closer to the egress point as the UAV has greater power reserves. In some embodiments, the UAV may be moved based on its model type and dimensions (e.g., to a charging pad that fits the specific model of UAV).

Figure 5:
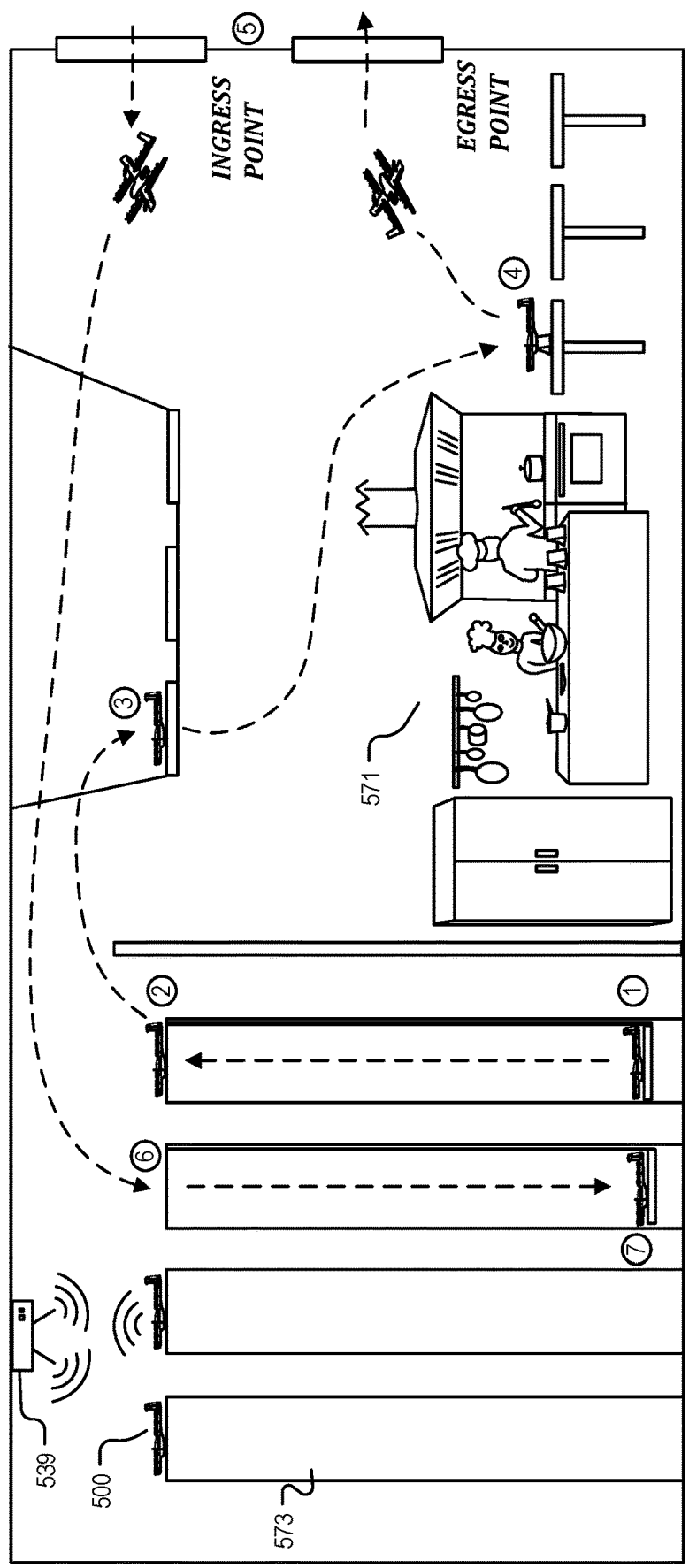
FIG. 5 illustrates example UAV operation within a storage facility, in accordance with an embodiment of the disclosure.

FIG. 5 illustrates example UAV 500 operation within a storage facility, in accordance with an embodiment of the disclosure. As depicted, a high density warehouse will require careful planning and optimization of aircraft locations as it may not be possible for all aircraft 500 to be able to take off or be loaded with packages at all times. Aircraft 500 may have to be charged in a queue or rack (e.g., storage rack 573) where only the aircraft nearest the top/exit may be able to takeoff due to density restrictions. Accordingly, packages may have to be loaded in specific spots (see e.g., loading position 4) that should only be occupied by aircraft ready for a mission.

Accordingly, a fleet management system (including communication system 539 which may be a wireless router) may track the battery charge status of each aircraft 500. As spots free up—at the top of charging racks, or in package loading positions—then aircraft 500 with the highest charge level should be moved to one of these spots (see e.g., low-charge aircraft 500 in position 1 is moved to position 2 once charged). Put another way, UAV 500 may measure its power source charge level (e.g., battery charge), and send a signal, including the power source charge level, to an external device (e.g., the fleet management system including communication system 539). Signals may be sent continuously, periodically, or once certain events occur (e.g., a threshold charge is reached). In response to sending the signal, UAV 500 may receive movement instructions from the external device (e.g., the fleet management system), and in response to receiving the movement instructions, engage the one or more sources of propulsion to move UAV 500 from a first location on storage rack 573 to a second location within a storage facility. In one embodiment, the second location may be a higher elevation (e.g., position 2) than the first location on storage rack 573. It is appreciated that UAV 500 may mover itself to position 2, or may be moved with a conveyor system inside storage rack 573. UAV 500 in the second location (e.g., position 2) may have a higher power source charge level than one or more UAVs disposed at lower elevations (e.g., position 1) on storage rack 573. In another or the same embodiment, the second location (e.g., positions 2 or 3) is closer to an egress point of the storage facility than the first location, and UAV 500 may have a higher power source charge level than one or more UAVs disposed further away (e.g., in position 1) from the egress point than the second location. It is appreciated that "further away" aircraft may be aircraft that are further away from an egress point based on a flight distance or flight time, and not actual linear distance. Moving aircraft into their appropriate location based on charge/range may be a continual process ensuring that the exit or package loading spots (e.g., position 4) are never occupied by aircraft waiting to finish charging, whilst another ready aircraft is blocked from accepting a mission.

In some embodiments, the signal that UAV 500 sends further includes information about its UAV type (e.g., short range UAV, medium range UAV, long range UAV, fast charging, slow charging, etc.). In some embodiments, a range is calculated (e.g., either by the UAV or by the fleet management system) based on the power source charge level and the UAV type. The movement instructions that are sent may be based on the range.

In the depicted embodiment, one example of a second location is a holding pad (e.g., position 2) disposed proximate to merchant location 571 in the storage facility. Here the holding pad is disposed proximate to, and suspended from, the roof of the storage facility to keep the floor space open to facility personnel. Merchant location 571 is an industrial kitchen located in the warehouse to prep meals and load them onto aircraft 500. This way, healthy meals can be prepared and delivered fresh by UAVs 500 as soon as they are ready. As shown, UAVs 500 may wait on the holding pads until UAV 500 receives a package load request from the external device (e.g., communication system 539). Then UAVs 500 may fly down to the loading station (position 4) to receive a package (e.g., food, personal goods, or the like) that can be attached to UAV 500. UAVs 500 may then fly out the egress point to complete the mission (e.g., position 5).

After the UAVs return from a delivery mission, incoming aircraft may be sorted into the queue based on relative charge status. In the depicted embodiment, the aircraft lands on top of the rack (position 6), and it is determined that the aircraft has very little battery charge so it is sent to the bottom of the rack (position 7). Incoming aircraft with high remaining capacity may be sorted with higher priority (e.g., higher up in charging rack or closer to egress points) than any already parked aircraft with lower charge.

Figure 6:
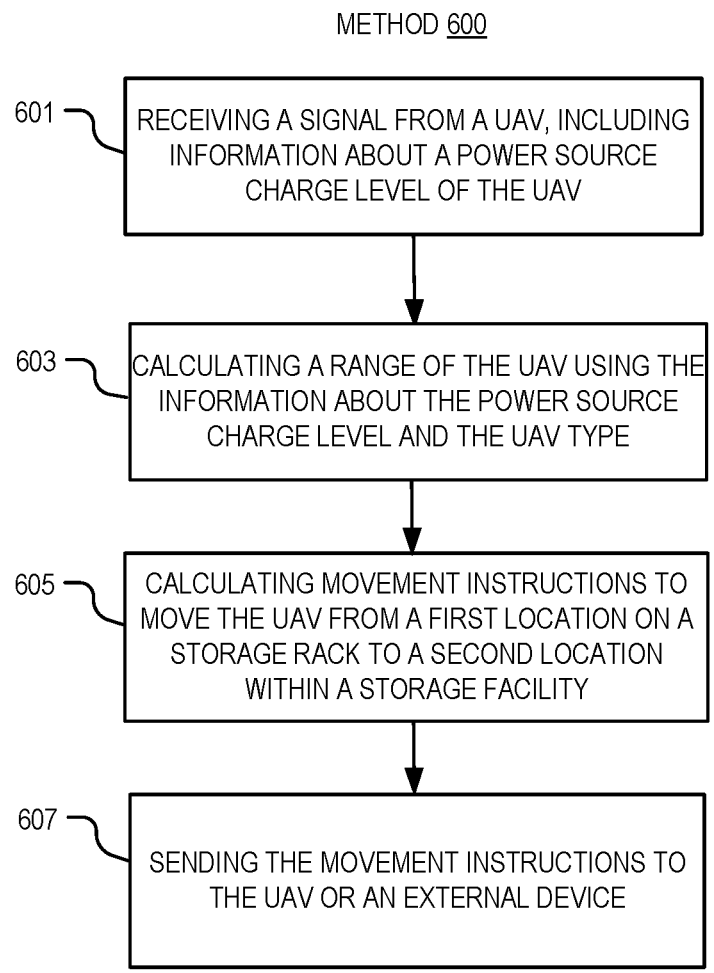
FIG. 6 illustrates a method of controlling UAV operation, in accordance with an embodiment of the disclosure.

FIG. 6 illustrates a method 600 of controlling UAV operation, in accordance with an embodiment of the disclosure. One of ordinary skill in the art will appreciate that blocks 601-607 may occur in any order and even in parallel. Additionally, blocks may be added to, or removed from, method 600, in accordance with the teachings of the present disclosure.

Block 601 shows receiving (e.g., by a communication component in a fleet management system) a signal (e.g., via WiFi) from a UAV, including information about a power source charge level (e.g., battery level) of the UAV. In some embodiments, the signal may also include information (e.g., a unique identification number, string of text, or the like) about the type of UAV sending the signal.

Block 603 depicts calculating a range of the UAV using the information about the power source charge level and the UAV type. For example, once the UAV fleet management system knows both the charge level and type of UAV, it may be able to calculate the range of the UAV (e.g., the distance it can travel without needing recharging). In some embodiments, calculating the range further includes using information about at least one of payload type, payload weight, environmental conditions outside the storage facility, or elevation conditions outside of the storage facility. This is because all of these factors may contribute to the range that the UAV can fly outside of the facility.

Block 605 illustrates calculating, based on the range, movement instructions to move the UAV from a first location on a storage rack in the storage facility to a second location within a storage facility. In some embodiments, the second location has a higher elevation than the first location, and the second location is on the storage rack. The UAV may have a higher power source charge level than one or more UAVs disposed at lower elevations than the second location on the storage rack. In another or the same embodiment, the second location is closer to an egress point than the first location, and the UAV has a higher power source charge level than one or more UAVs disposed further away from the egress point than the second location. In some embodiments, the second location may be a holding pad disposed proximate to a merchant (e.g., restaurant, convenience store, drug store, or the like) location in the storage facility.

Block 607 depicts sending the movement instructions to the UAV or an external device (e.g., a conveyor system inside a storage rack, other robots to move the UAVs, or the like). The UAV may then move itself, in accordance with the movement instructions, by engaging one or more sources of propulsion. Alternatively or additionally, conveyor systems located inside storage racks may receive the signal, and move the UAV around inside the storage rack. In some embodiments, the conveyor system may include a series of charging pads connected to belts, chains, or hydraulic lifts to move the pads that the UAV is situated on in one or more dimensions. The conveyor system may include a communications system and controller (e.g., processor, or the like), to receive the signals from the UAV control system and engage the moving components (e.g., belts, chains, or hydraulic lifts). Thus, very high density UAV storage may be achieved.

The processes explained above are described in terms of computer software and hardware. The techniques described may constitute machine-executable instructions embodied within a tangible or non-transitory machine (e.g., computer) readable storage medium, that when executed by one or more machines will cause the machine(s) to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned aerial vehicle (UAV), comprising:
one or more sources of propulsion coupled to provide propulsion to the UAV;
a power source coupled to power the one or more sources of propulsion;
a communication system coupled to the power source to communicate with an external device; and
a controller coupled to the communication system, the power source, and the one or more sources of propulsion, wherein the controller includes executable instructions that when executed by the controller causes the UAV to perform operations, including:
measuring a power source charge level of the UAV;
sending a signal including the power source charge level of the UAV to the external device;
in response to sending the signal, receiving movement instructions from the external device; and
in response to receiving the movement instructions, engaging the one or more sources of propulsion to move the UAV from a first location on a storage rack to a second location within a storage facility, wherein the second location has a shorter flight time to an egress point of the storage facility or to a staging area within the storage facility relative to the first location, and wherein the UAV moves to the second location instead of other UAVs proximate to the first location when the power source charge level of the UAV is higher than that of the other UAVs.

2. The UAV of claim 1, wherein the second location has a higher elevation than the first location, and wherein the second location is on the storage rack.

3. The UAV of claim 1, wherein the second location is a holding pad disposed proximate to the staging area and the staging area includes a merchant location in the storage facility, wherein the storage facility contains the storage rack.

4. The UAV of claim 1, wherein the power source is irremovably coupled to the UAV and receives charge via direct electrical connection to a charging pad disposed on the storage rack.

5. The UAV of claim 1, wherein the second location is closer to the egress point of the storage facility than the first location.

6. The UAV of claim 5, wherein the UAV has a higher power source charge level than that of one or more of the other UAVs disposed further away from the egress point than the second location.

7. The UAV of claim 1, wherein the signal further includes information about a UAV type.

8. The UAV of claim 7, wherein a range is calculated based on the power source charge level and the UAV type, and wherein the movement instructions are based on the range.

9. A method of unmanned aerial vehicle (UAV) operation, comprising:
receiving a signal from a UAV including information about a power source charge level of the UAV;
calculating, based on the information in the signal, movement instructions to move the UAV from a first location on a storage rack to a second location within a storage facility, wherein the second location has a shorter flight time to an egress point of the storage facility or to a staging area within the storage facility relative to the first location, and wherein the movement instructions direct the UAV to move, or be moved, to the second location instead of other UAVs proximate to the first location when the power source charge level of the UAV is higher than that of the other UAVs; and
sending the movement instructions to the UAV or an external device.

10. The method of claim 9, wherein the second location is a holding pad disposed proximate to the staging area and the staging area includes a merchant location in the storage facility, wherein the storage facility contains the storage rack, the method further comprising:
sending a package load request to the UAV to instruct the UAV to move off of the holding pad when a package is ready for delivery.

11. The method of claim 9, wherein the UAV is preferentially moved to the second location over the other UAVs proximate to the first location when the UAV is deemed to be more mission-ready than the other UAVs.

12. The method of claim 9, wherein the signal includes information about UAV type, and wherein the movement instructions are calculated using both the power source charge level and the UAV type.

13. The method of claim 12, further comprising calculating a range of the UAV using the information about the power source charge level and the UAV type.

14. The method of claim 13, wherein calculating the range further includes using information about at least one of payload type, payload weight, environmental conditions outside the storage facility, or elevation conditions outside of the storage facility.

15. The method of claim 9, wherein the second location has a higher elevation than the first location, and wherein the second location is on the storage rack.

16. The method of claim 15, wherein the UAV has a higher power source charge level than that of the other UAVs disposed at lower elevations than the second location on the storage rack.

17. The method of claim 9, wherein the second location is closer to the egress point than the first location.

18. The method of claim 17, wherein the UAV has a higher power source charge level than that of one or more of the other UAVs disposed further away from the egress point than the second location.

19. A non-transitory computer readable storage medium including instructions that when executed by a machine causes the machine to perform operations, comprising:
receiving a signal from an unmanned aerial vehicle (UAV) including information about a power source charge level of the UAV;
generating, based on the information in the signal, movement instructions to move the UAV from a first location on a storage rack to a second location within a storage facility, wherein the second location has a shorter flight time to an egress point of the storage facility or to a staging area within the storage facility relative to the first location, and wherein the movement instructions direct the UAV to move, or be moved, to the second location instead of other UAVs proximate to the first location when the power source charge level of the UAV is higher than the other UAVs; and
sending the movement instructions to the UAV or an external device to facilitate movement of the UAV.

* * * * *